Patented Apr. 21, 1942

2,280,132

UNITED STATES PATENT OFFICE 2,280,132

ORGANIC ARSENIC COMPOUND AND METHOD OF OBTAINING THE SAME

Albert B. Scott, Douglaston, N. Y., and James A. Sultzaberger, Detroit, Mich., assignors to Parke, Davis & Company, Detroit, Mich., a corporation of Michigan No Drawing. Application August 21, 1937, Serial No. 160,349

4 Claims. (Cl. 260—440)

The invention is concerned with preparation of 3-amino-4-hydroxy phenylarsinoxide free base and useful combinations containing this free base.

Products have previously been described containing about 60% or less of the free base, 3-amino-4-hydroxy phenylarsinoxide, mixed with many impurities. Such products were brown, weakly red, or violet colored powders containing considerable amounts of sodium chloride. These were also not soluble in ethyl alcohol, and ethylene and propylene glycols. Such crude mixtures always contained more than 30% of inorganic salts and other impurities, so that the product charred when heated and left a saline residue. Moreover, these prior products failed to dissolve completely in organic solvents. Such a product was described by Ehrlich and Bertheim, Ber. 45:756 (1912) and these workers indicated that preparation of the pure free base was not possible because of the tendency of the free base to quickly deteriorate and decompose and because of the free base having great solubility in water, the same as the inorganic salts and other impurities associated therewith.

3-amino-4-hydroxy phenylarsinoxide free base has never previously been isolated as a chemical individual or obtained in a high degree of purity of the order of about 90 to 100%, such that the free base product has sufficient stability to possess practical utility in the field of chemistry and therapeutics. The crude free base product prepared by previous methods is so contaminated with impurities and has such a strong tendency to decompose rapidly to an even more contaminated product that it is of little or no practical utility.

An object of this invention is to obtain the free base, 3-amino-4-hydroxy phenylarsinoxide, in practically pure form from about 85 or 90% up to 100% chemical purity as a new composition of matter which can be used, especially in its higher degrees of purity, as an intermediate for carrying out chemical reactions leading to other arsenic compounds or derivatives, or which can be used directly, e. g. in the form of new compositions suitable for use in human therapy.

The above and other objects may be realized in one form of the invention by precipitation of impurities from a crude solution of 3-amino-4-hydroxy phenylarsinoxide free base by suitable choice of organic solvents, followed by precipitation of the free base itself.

Use of solvents and other methods for obtaining the new product of the invention are illustrated by the following examples:

Example 1

A sample of crude 3-amino-4-hydroxy phenylarsinoxide may first be produced by reducing a quantity of crystalline hydrochloride of 3-amino-4-hydroxy phenylarsonic acid of high purity with potassium iodide and sulfur dioxide in aqueous solution and subsequently salting out the crude product with sodium chloride by known methods. 22.2 grams of this impure free base product, containing less than half its weight of 3-amino-4-hydroxy phenylarsinoxide, as determined by iodine titration, is extracted with 40 cc. of absolute ethyl alcohol. Other alcohols may be used, such as methyl, ethyl, propyl, iso-propyl, n-butyl, sec. butyl, iso-butyl and tert. butyl alcohols. The alcoholic extract is treated with four to ten volumes of dry ethyl ether or other suitable water immiscible organic solvent which precipitates most of the remaining inorganic salts and also some organic material. After separating out the precipitate, e. g. by filtration or centrifugation, the ether is removed from the filtrate by vacuum distillation at room temperature and the alcohol solution concentrated to 20 cc. (2 cc. of alcohol for each gram of free base calculated as being present). This alcoholic concentrate is then treated with three volumes (60 cc.) of benzene to bring out further impurities and filtered. The final benzene-alcohol solution or filtrate is poured into 160 cc. of a hydrocarbon liquid, such as benzene, petroleum ether or a mixture of these two, to cause the free base to precipitate out. After separating the solvent, the product is found to be a white homogeneous amorphous powder. The result of iodine titration shows 33.5 to 33.6% of trivalent arsenic. An analysis by the method of Robertson, J. Am. Chem. Soc. 43:182 (1921), shows 34.8 to 35.8% total arsenic. These analyses indicate the product contains about 90% pure 3-amino-4-hydroxy phenylarsinoxide. The product dissolves moderately in water, but to a far less degree than the crude impure salted-out product heretofore known. The product is also soluble in acetone and dissolves readily in alcohols, glycols, glycerine, pyridine and aqueous glucose.

Example 2

This example is carried out in a manner exactly analogous to that of Example 1, except that successive portions of benzene are added to the final alcohol concentrate to obtain different fractions. In this way, an amorphous white product analyzing about 93 to 95% 3-amino-4-hydroxy phenylarsinoxide free base is obtained. This product may be further purified, if desired, by repeating the precipitation or by careful removal of alcohol, for example using a high vacuum. The practically 100% pure amorphous white powder obtained has the same properties as the 95% product or the product from Example 1 and is distinguishable therefrom only by exact chemical analysis, which shows a higher degree of purity. The product has a composition which may be represented by the formula:

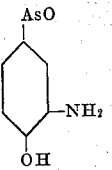

and contains practically the theoretical percentage of arsenic, namely, 37.7%.

In both of Examples 1 and 2, it is necessary to work with dry and preferably air-free materials, because the free base oxidizes extremely readily in the presence of acid or alkali or moisture. The amorphous free base is sufficiently soluble in water and its arsenoxide group has such a great tendency to combine with numerous solvents that it can only be obtained in this amorphous anhydrous form by the use of inert anhydrous solvents as described in the above examples.

One of the outstanding properties of the purified free base of the invention is its great stability over and above the crude impure mixtures previously known. Its forms may be made up in dilute aqueous solution without danger of oxidizing very rapidly, as is the case with known impure mixtures.

The examples given above are intended to serve as illustrations of the invention and are not intended to limit it to the precise materials and details disclosed therein, since a number of variations of the invention are possible within the general scope as defined by the appended claims.

What we claim as our invention is:

1. Method for the preparation of 3-amino-4-hydroxy phenylarsinoxide which comprises extracting with anhydrous alcohol a mixture containing said oxide, precipitating inorganic salts and organic impurities from the alcohol solution with a water-immiscible organic solvent, separating the solution from the precipitate, concentrating the separated solution and precipitating 3-amino-4-hydroxy phenylarsinoxide from the latter with a liquid hydrocarbon.

2. Method for the preparation of 3-amino-4-hydroxy phenylarsinoxide which comprises extracting with anhydrous alcohol a mixture containing said oxide, precipitating inorganic salts and organic impurities from the alcohol solution with ether, separating the solution from the precipitate, concentrating the separated solution and precipitating 3-amino-4-hydroxy phenylarsinoxide from the latter with benzene.

3. In a process for the preparation of 3-amino-4-hydroxy phenylarsinoxide from a solution of the same in an inert anhydrous water-immiscible organic solvent contaminated with inorganic and organic impurities, the step which comprises precipitating purified 3-amino-4-hydroxy phenylarsinoxide from said solution by addition thereto of a liquid hydrocarbon.

4. A product comprising solid 3-amino-4-hydroxy phenylarsine oxide, said product being a substantially white amorphous solid, completely soluble in alcohol and containing approximately 37.7% arsenic.

ALBERT B. SCOTT.
JAMES A. SULTZABERGER.